United States Patent [19]

Cady

[11] Patent Number: 4,919,060
[45] Date of Patent: Apr. 24, 1990

[54] SPOKED WHEEL FERTILIZER INJECTOR
[75] Inventor: William F. Cady, Colo, Iowa
[73] Assignee: Cady Systems, Inc., Ankeny, Iowa
[21] Appl. No.: 301,899
[22] Filed: Jan. 24, 1989
[51] Int. Cl.$^5$ .............................................. A01C 23/02
[52] U.S. Cl. ....................................... 111/128; 111/91
[58] Field of Search ................... 111/6, 7, 90, 91, 118, 111/119, 128; 137/625.6

[56] References Cited

U.S. PATENT DOCUMENTS

| 2,649,061 | 8/1953 | Hawkins. | |
|---|---|---|---|
| 3,025,806 | 3/1962 | Peck. | |
| 3,602,166 | 8/1971 | Peterson. | |
| 3,707,132 | 12/1972 | Hansen | 111/7 |
| 4,494,574 | 1/1985 | Casilli et al. | 137/625.6 |
| 4,677,921 | 7/1987 | Brown | 111/6 |

OTHER PUBLICATIONS

"VSL of a Point-Injector Fertilizer Applicator for Better Fertilizer Management with Conservation tillage", Presentation at the 1983 Mid-Central Meeting by ASAE, Mar. 11-12, 1983, Ag Eng Dept at Iowa State University, Ames, Iowa.

Primary Examiner—Danton D. DeMille
Attorney, Agent, or Firm—G. Brian Pingel

[57] ABSTRACT

An implement for injecting a fluid like material below the surface of the ground having a hub portion and a plurality of hollow spokes extending radially outward therefrom. The hub portion is formed of a housing having an open center in which a sleeve bearing is secured and an axle position in the bearing to permit rotational movement of the housing with respect to the axle with the axle and the bearing having a clearance of no greater than 0.0030 inches.

10 Claims, 3 Drawing Sheets

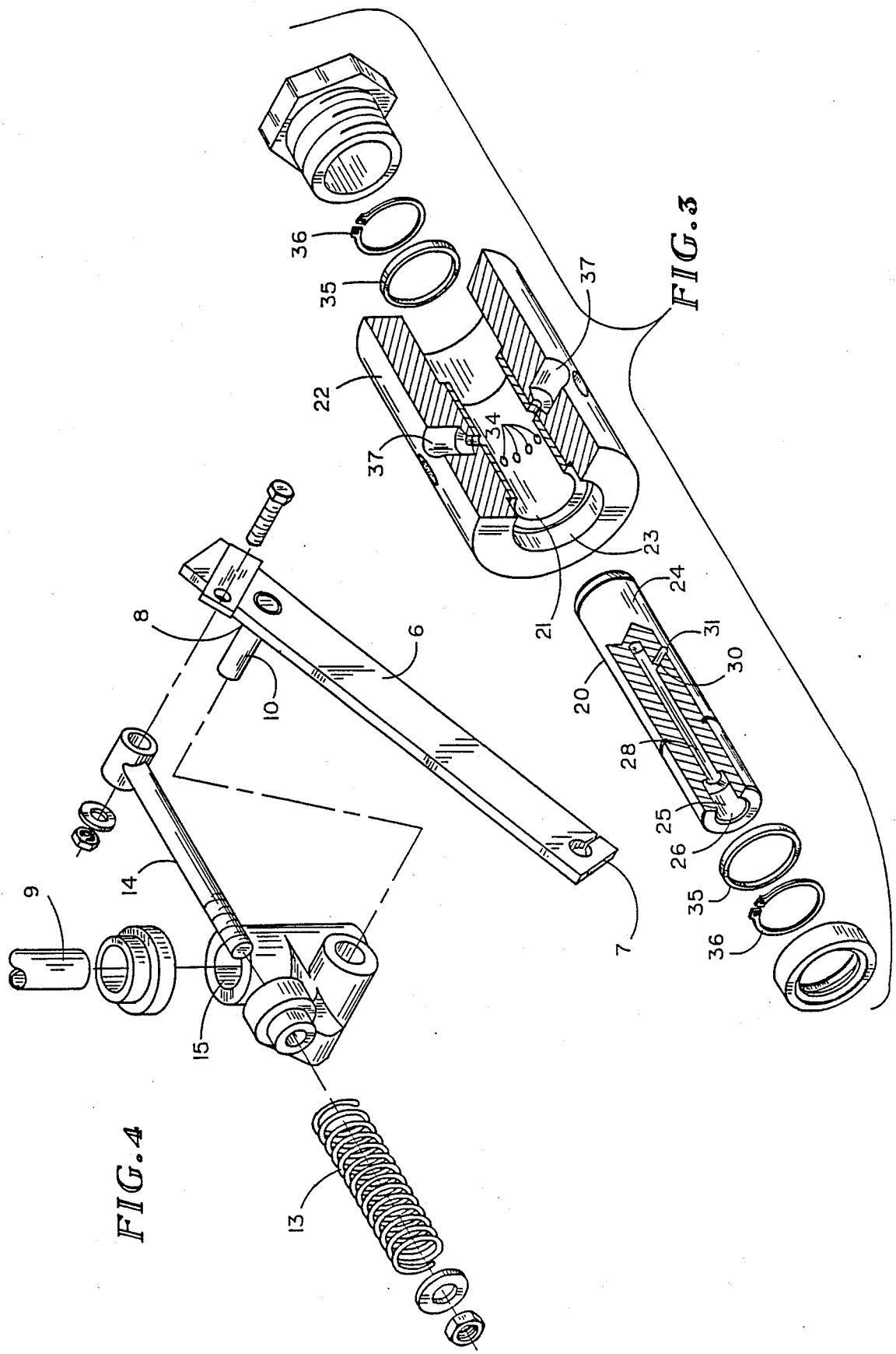

SPOKED WHEEL FERTILIZER INJECTOR

BACKGROUND OF THE INVENTION

1. Field of the Invention

The present invention relates in general to implements for injecting liquid fertilizers into the ground and more specifically relates to such implements having a circular array of spokes for penetrating the ground and supplying fertilizers thereto.

2. Description of the Prior Art

A variety of implements have been utilized for injecting liquid fertilizers into the soil of a field for agricultural purposes. One of the older types of such implements includes a plurality of spaced apart knives that break the ground and provide narrow slits into which the liquid fertilizer is dispersed. Although implements providing a knife application of fertilizer have proven to be an effective means for efficiently distributing fertilizer in a field, the tractive energy required for such application is relatively substantial in comparison to the application of fertilizer by a spray operation. For this reason, a variety of spoked wheel type application implements have been developed as alternatives to subsurface knife application implements.

In contrast to the knife application of fertilizer that requires a continuous ground disrupting operation, the spoked wheel implements provide an application of fertilizer into the soil at spaced intervals to be essentially as energy efficient as fertilizer spraying devices. However, prior to the present invention spoked wheel fertilizer applicators have not been widely accepted on a commercial basis. Either they are needlessly complex as exemplified by the structures disclosed in U.S. Pat. Nos. 3,602,166; 3,649,061; and 3,025,806, or they do not have means for preventing the loss of fertilizer into the atmosphere as exemplified by the device disclosed in U.S. Pat. No. 2,876,718.

During the early 1980's, Iowa State University became involved in developing an improved spoked wheel fertilizer applicator. Several embodiments of the type of spoked wheel applicator developed by personnel at Iowa State University are disclosed in Paper No. MCR 83-114 presented to the American Society of Agricultural Engineers Mar. 11, 1983. The basic construction of the Iowa State University embodiments included a wheel with a rotary valve in its hub to sequentially provide fertilizer to spokes extending outwardly therefrom so that dispersement of fertilizer from the spokes primarily occurs only when the spokes are ground engaged. Although the embodiments developed by Iowa State University are an improvement over earlier devices, the rotary valve construction they include is deficient in its sealing capabilities and its operational performance. Such deficiencies in the Iowa State University embodiments result from the use of a metal axle and a nylon axle bearing to form the rotary valve structure to provide durability of the valve. However, such valve construction does not permit for the clearance between the axle and the bearing to be sufficiently small to provide proper sealing without making the valve susceptible to seizure during operation due to expansion of the valve components as a result of heat or moisture absorption. Furthermore, such embodiments had problems with spoke breakage because the hub was formed of steel and did not provide a resilient mount for the spokes.

The present invention provides an improved spoked wheel applicator that efficiently and economically injects fertilizer into the soil by the use of a rotary valve that not only has sufficiently small clearance between its components to provide optimum sealing operation of the valve, but also is constructed to reduce the possibility of structural damage and seizure of the applicator due to heat.

SUMMARY OF THE INVENTION

The present invention provides an implement attachable to a movable means for injecting a fluid like substance below the surface of the ground to disperse it into the soil. The implement has a cylindrically shaped hub portion, support means for rotatably attaching the hub portion to said movable means, a plurality of hollow spokes extending radially outward from the circumference of the hub portion, and a fluid supply means for supplying fluid to the hub portion.

The hub portion includes an axle, a sleeve bearing for the axle and a cylindrically shaped housing with an axially aligned open center portion in which the axle bearing is secured. The axle has axially aligned and radially aligned fluid passages in communication with one another, and an outer port for said radially aligned fluid passage opening at the circumference of said axle. The sleeve bearing includes a plurality of radially aligned, spaced apart, coplanar throughbores. The throughbores of the sleeve bearing are positioned with respect to the axle so that as rotational movement occurs between the axle and the bearing, the outlet port of the radially aligned passage of the axle temporarily aligns with the throughbores of the bearing, one at a time in sequence. Correspondingly, the housing has a number of radially aligned throughbores aligned with at least several of the bearing throughbores to provide passages for fluid flow from the axle to open ends of the hollow spokes extending outwardly from the hub. The sleeve bearing is formed from a self-lubricating polytetrafluoroethylene, and the clearance between the axle and the bearing is not greater than 0.0030 inches.

BRIEF DESCRIPTION OF THE DRAWINGS

FIG. 3 is an exploded perspective view of a hub portion that forms a part of the preferred embodiment of FIG. 1;

FIG. 4 is an exploded perspective view of a spring biased castor connector forming a part of the preferred embodiment of FIG. 1; and FIG. 5 is a side view of the embodiment of FIG. 1 shown in operation as it is transvering a field.

DETAILED DESCRIPTION OF THE PREFERRED EMBODIMENT

Figure 1:
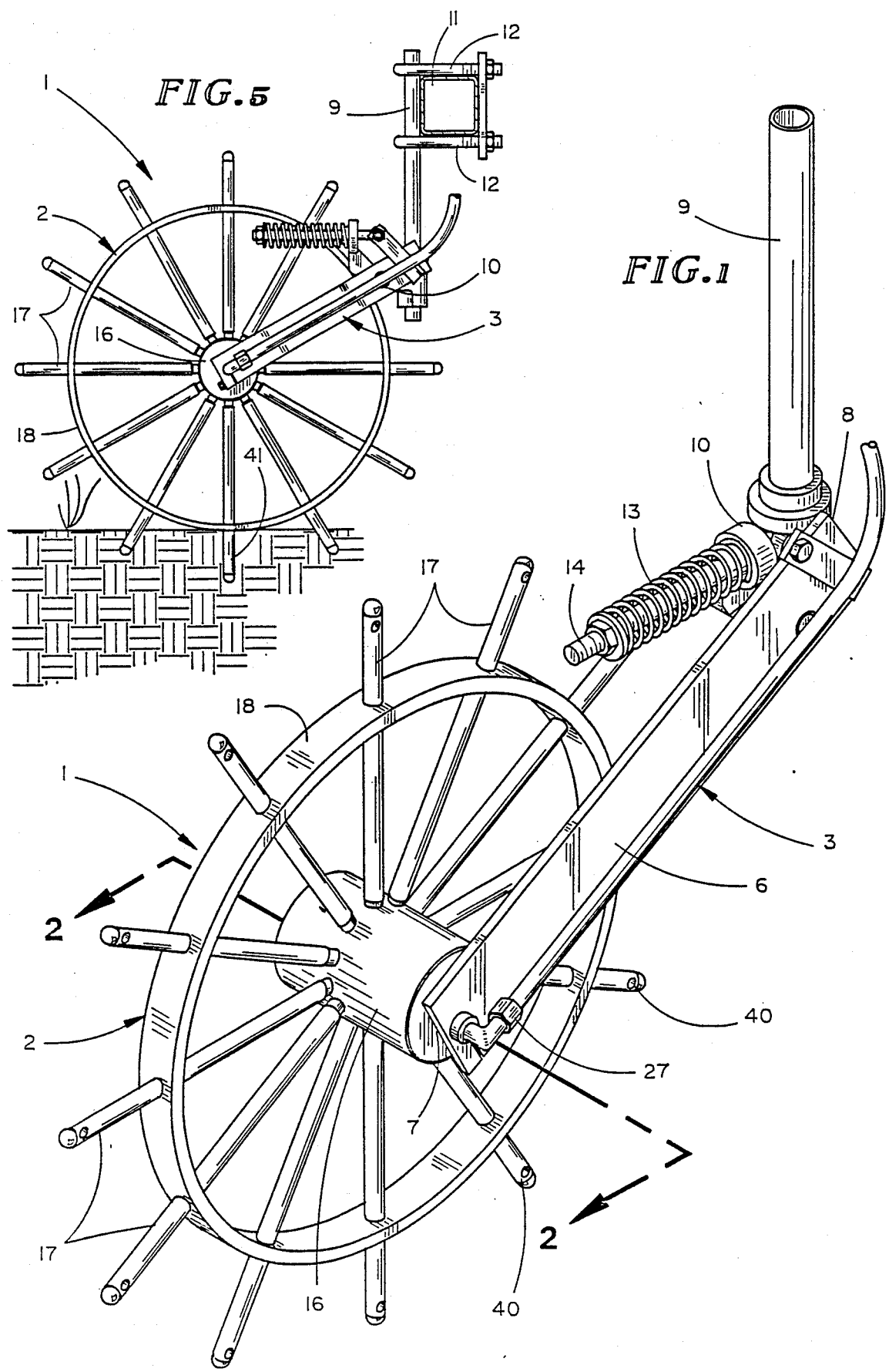
FIG. 1 is a side perspective of a preferred embodiment of the present invention.

With reference first to FIG. 1, a preferred embodiment of a fertilizer injecting implement of the present invention is shown generally at 1. The implement 1 is formed of a spoked wheel assembly 2 and a frame assembly 3 that serves as a support means for rotatably attaching the wheel assembly 2 to a means for moving the implement 1 about a field, such as a tractor or trailer or a tool bar carried thereby.

The frame assembly 3 comprises a support arm 6 rotatably secured at one end 7 to the wheel assembly 2 and at an opposite end 8 to a support rod 9 by means of a spring biased castor type joint 10 that permits pivoted movement of the arm 6 with respect to the rod 9. As shown in FIG. 5, the support rod 9 is used for attachment of the implement 1 to a tool bar 11 preferably by U-clamps 12.

Referring to FIG. 4, the spring biased joint 10 has a coil spring 13 that acts on a pin 14 to urge the support arm 6 in a downward direction, but also permits the support arm to move in an upward direction if the support arm 6 encounters a sufficient force to overcome the spring biasing of the joint 10. The joint 10 also has a castor type cylindrically shaped connector 15 for receiving the support arm 9 to permit the implement 1 to castor with respect to the tool bar 11. Preferably, such castoring movement is limited to 30° in either direction.

Referring again to FIG. 1, the spoked wheel assembly 2 includes a hub portion 16, a plurality of hollow spokes 17 extending radially outward from the hub portion 16, and a circular rim 18 that is concentric with the hub portion 16. The rim 18 serves as a means for bracing and stabilizing the position of the spokes 17 with respect to the portion 16 and controls depth of penetration in the ground.

Figure 2:
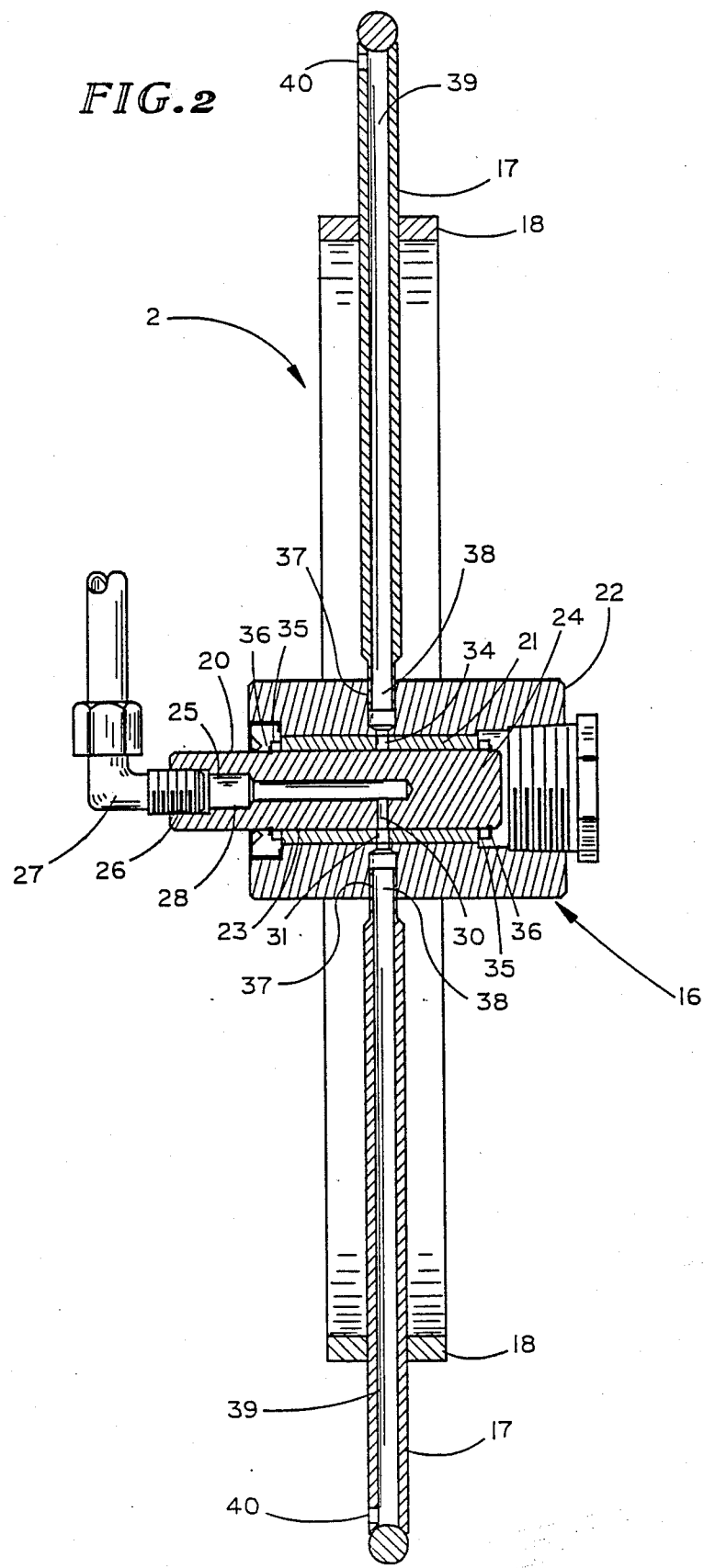
FIG. 2 is a sectional view taken along the line 2—2 of FIG. 1.

With reference now to FIGS. 2 and 3, the hub portion 16 includes an axle 20, a sleeve bearing 21 for the axle 20 and a cylindrically shaped housing 22 with ah axially aligned open center 23 in which the bearing 21 is secured. Preferrably, the axle 20 is formed from stainless steel to prevent corrosion due to contact with fertilizing agents, but may also be formed from a mild steel and possibly even from a high strength plastic.

The axle 20 has a closed inner end 24 and an open end 25 that preferrably has internal threads 26 for attachment of one end of a fluid supply means 27. The axle 20 also has an axially aligned fluid passage 28 extending from the open end 25 at least half the length of the axle 20. As can best be seen from FIG. 2, the axle passage 28 is stair-stepped inwardly to reduce its diameter at the center of the axle 20. The axle 20 also includes a second radially aligned fluid passage 30 extending from the first fluid passage 28 to an outlet port 31 at the axle circumference.

The sleeve bearing 21, as best shown in FIG. 3, has a plurality of radially aligned, spaced apart, coplanar throughbores 34 to provide for the passage of fluid through the wall of the bearing 21. The throughbores 34 are positioned with respect to the axle 20 so that as rotational movement occurs between the bearing 21 and the axle 20, the outlet port 31 of the axle passage 30 temporarily aligns with the throughbores 34, one at a time in sequence. Thus, the axle 20 and sleeve bearing 21 act as a rotary valve for metering fluid from the supply means 27.

The bearing 21 is formed from a self-lubricating fluoroplastic such as preferably polytetrafluoroethylene (PTFE) to provide a bearing that will absorb little liquid and has a low coefficient of thermal expansion. To provide for optimum sealing between the axle 20 and bearing 21, the clearance therebetween must be no greater than 0.0030 inches and may be as narrow as 0.0008 inches. Preferably, the clearance is 0.0015 or less. Also, thrust washers 35 are held in place by snap-rings 36 at each end of the bearing 21 for securing the bearing in a proper position with respect to the axle 20. Preferably the PTFE forming the bearing 21 is impregnated with mica fibers and has a composition such as that of Fluorosint 500 manufactured by the Polymer Corporation. It is also possible that other fluoroplastics may be used such as ethylene-chlorotrifluoroethylene copolymer or polyvinylidene flouride.

The housing 22 includes a plurality of radially aligned, spaced apart, coplanar throughbores 37 similar to those of the sleeve bearing 21. Preferably there is a throughbore 37 in the housing 22 corresponding to each throughbore 34 of the bearing 21, and the bearing 21 is secured in the housing 22 with the throughbores 34 and 37 in axial alignment with one another. Preferably, the housing 22 is formed from a high strength polymer such as Delrin to provide a resilient mounting support for the spokes 17.

The spokes 17 each have an open inner end 38 that is associated with one of the throughbores 37 of the housing 22. Preferably, the open ends 38 of the spokes 17 are secured to the housing 22 by threading into the throughbores 37 or by other known attachment means so that the spokes 17 extend radially outward from the housing 22. The open end of each of the spokes 17 leads to a hollow center portion 39, and at the free ends of each spokes 17 is an outlet passage 40 that also communicates with the hollow center 39. Thus, fluid passages are formed by the axle passages 28 and 30, the throughbores 34 in the bearing 21, the throughbores 37 in the housing 22 and the hollow center 39 of the spokes 17 to permit fluid to flow from the supply means 27 to the outlet passage 40 of the spokes 17.

In operation, the assembly 1 is pulled behind the tool bar 11 with certain of the spokes 17 alternately engaging and penetrating the ground as depicted in FIG. 5. The axle 20 must be aligned orthogonal with the ground so that the spokes 17 will be aligned with the axle passage 30 only when they are also orthogonal with the ground as indicated by a spoke 41 shown in FIG. 5. Due to the action of the rotary valve formed by the axle 20 and bearing 21 liquid will be dispersed by the spoke 41 into the ground. It should be noted that because the spokes must penetrate the surface of the ground, it is important that they are composed of a high strength material to prevent their breakage or bending especially when used with compacted or crusty soil. Preferably, the spokes 17 are formed from drawn over mandrel, stainless steel, mechanical tubing having a yield strength of 60,000 pounds.

Although all of the spokes 17 are filled with liquid during normal operation, the rotary valve sealing action prevents liquid dispensing from the spokes 17 unless they are aligned with the axle passage 30. Due to the close tolerances between the axle 20 and the sleeve 21 there is essentially no carry up of liquid to permit it to escape into the atmosphere. Furthermore, the use of PTFE in forming the bearing 21 virtually eliminates seizure problems associated with prior art devices, and by forming the housing 22 of a resilient material less damage to the spokes 17 results.

A specific example of this invention has, thus, been described herein in order to illustrate the invention. It is expected that changes can be made in the described embodiment and that other embodiments can be designed by those skilled in the art which will remain within the true spirit and scope of this invention.

I claim:

1. An implement attachable to a movable means for injecting a fluid like substance below the surface of the ground, said implement comprising:

(a) a cylindrically shaped hub portion including:

(1) an axle having a closed end, an open end, an axially aligned first fluid passage extending from said open end at least half the length of said axle and a radially aligned second fluid passage extending from the first fluid passage to an outlet port on the circumference of said axle;

(2) a sleeve bearing extending a major portion between the ends of the hub surrounding said axle and said sleeve having at least one radially extending throughbore; and (3) a cylindrically shaped housing having an axially aligned open center portion in which said bearing is located to serve as a support bearing for said housing and said housing having a number of radially aligned throughbores;

(b) support means for rotatably attaching said hub portion to said movable means;

(c) a number of hollow spokes each having a hollow center portion, one open end secured in one of the radial throughbores of said housing to extend radially outward therefrom and an opposite end with an outlet passage communicating with said hollow center portion;

(d) fluid supply means connected to the open end of said axle to provide fluid thereto that enters said axle fluid passages and is sequentially metered to said spokes through the throughbores of said sleeve and said housing; and (e) said bearing is formed a self-lubricating fluoroplastic and the clearance between said axle and said bearing is not greater than 0.0030 inches.

2. An implement attachable to a movable means for injecting a fluid like substance below the surface of the ground, said implement comprising:

(a) a cylindrically shaped hub portion including:
  (1) a cylindrically shaped axle having a closed end, an open end, an axially aligned first fluid passage extending from said open end at least half the length of said axle and a radially aligned second fluid passage extending from the first fluid passage to an outlet port on the circumference of said axle;
  (2) a sleeve bearing for receiving a major portion of said axle having a plurality of radially aligned, spaced apart, coplanar throughbores positioned with respect to said axle so that as rotational movement occurs between said axle and said bearing, the outlet port of the second fluid passage of said axle temporarily aligns with said throughbores of said bearing, one at a time in sequence: and
  (3) a cylindrically shaped housing having an axially aligned open center portion in which said bearing is secured to serve as a support bearing for said housing and said housing having a number of radially aligned throughbores aligned with at least several of said bearing throughbores;

(b) support means for rotatably attaching said hub portion to said movable means;

(c) a number of hollow spokes each having a hollow center portion, one open end secured in one of the radial throughbores of said housing to extend radially outward therefrom and an opposite end with an outlet passage communicating with said hollow center portion;

(d) fluid supply means connected to the open end of said axle to provide fluid thereto that enters said axle fluid passages and is sequentially metered to said spokes during movement of said bearing with respect to said axle; and (e) said bearing is formed from a self-lubricating fluoroplastic and the clearance between said axle and said bearing is not greater than 0.0030 inches.

3. An implement as recited in claim 2 and further including means associated with said spokes to brace said spokes in position with respect to said hub.

4. An implement as recited in claim 2 wherein said bearing is formed from polytetrafluoroethylene impregnated with mica fibers.

5. An implement as recited in claim 2 wherein the axially aligned passage of said axle is stair-stepped inwardly to reduce the diameter of said passage at the center of the axle.

6. An implement as recited in claim 2 wherein said support means is formed of a frame assembly comprising:

(a) a support arm rotatably secured at one end to said hub portion;

(b) a support rod attached at one end to said moving means and pivotally attached at an opposite end to said support arm; and (c) spring biasing means associated with said support arm and said support rod to provide a spring biasing action on said support arm with respect to said support rod.

7. An implement as recited in claim 6 wherein said support arm is attached to said support rod by a castor type connector that permits the implement to castor with respect to said moving means.

8. An implement as recited in claim 7 wherein said bearing is formed from polytetrafluoroethylene with mica fibres.

9. An implement as recited in claim 8 wherein the clearance between said axle and said bearing is in a range from 0.0008 to 0.0030 inches.

10. An implement as recited in claim 9 wherein said housing is formed from a resilient material.

* * * * *